(12) United States Patent
Allen et al.

(10) Patent No.: US 7,689,794 B2
(45) Date of Patent: Mar. 30, 2010

(54) SYSTEM AND METHOD FOR HANDLING MEMORY ALLOCATION FAILURES THROUGH RESERVE ALLOCATION OF EVENT DATA

(75) Inventors: Eric Allen, Lawrenceville, GA (US); Altan Stalker, Lawrenceville, GA (US); Paul Porter, Lawrenceville, GA (US); Mark Murray, Atlanta, GA (US); David Decker, Atlanta, GA (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 261 days.

(21) Appl. No.: 10/970,956

(22) Filed: Oct. 22, 2004

(65) Prior Publication Data

US 2006/0100993 A1    May 11, 2006

(51) Int. Cl.
G06F 12/00 (2006.01)
G06F 12/02 (2006.01)
G06F 21/00 (2006.01)
G06F 13/00 (2006.01)
G06F 13/28 (2006.01)
G06F 9/26 (2006.01)
G06F 9/34 (2006.01)
G06F 9/00 (2006.01)
G06F 9/24 (2006.01)
G06F 15/177 (2006.01)
H04N 7/18 (2006.01)
H04N 7/173 (2006.01)

(52) U.S. Cl. ............... 711/170; 711/1; 711/6; 711/104; 711/165; 711/171; 711/172; 711/173; 711/203; 711/209; 713/1; 713/2; 725/87; 725/89; 725/92; 725/94; 725/101

(58) Field of Classification Search .................. 711/154, 711/170–173, 1, 6, 104, 165, 203, 209; 719/330; 713/1, 2; 725/87, 89, 92, 94, 101
See application file for complete search history.

(56) References Cited

U.S. PATENT DOCUMENTS 4,811,216 A * 3/1989 Bishop et al. ............... 711/153

(Continued)

FOREIGN PATENT DOCUMENTS

WO    WO 2007/067158    6/2007

OTHER PUBLICATIONS

"DCE 1.1: Remote Procedure Call" CAE Specification—The Open Group, [Online] No. C706, Oct. 1997, pp. 5, 43, 329-331, 374, 575, 588, 602-607, 671-672 URL: http://www.opengroup.org/onlinepubs/9692999399/toc.pdf.

(Continued)

*Primary Examiner*—Sanjiv Shah
*Assistant Examiner*—Yaima Campos
(74) *Attorney, Agent, or Firm*—Merchant & Gould (57) ABSTRACT

Disclosed are systems and methods for reserve allocation of event data. A request event is received. The request event is associated with memory storing request event data. Memory for response event data is allocated from a first pool. The response event data is associated with a response, and the response is associated with the request. Upon failure of the allocation of memory for the response event data, memory is obtained for out-of-memory response event data. The out-of-memory response event data is associated with the response event. The request event is completed using the response event.

18 Claims, 10 Drawing Sheets

U.S. PATENT DOCUMENTS

| | | | |
|---|---|---|---|
| 5,784,698 A * | 7/1998 | Brady et al. | 711/171 |
| 5,930,829 A * | 7/1999 | Little | 711/170 |
| 6,981,244 B1 * | 12/2005 | Kathail et al. | 717/124 |
| 7,035,990 B1 * | 4/2006 | Muhlbauer | 711/172 |
| 2003/0056076 A1 * | 3/2003 | Cook et al. | 711/173 |
| 2004/0003188 A1 * | 1/2004 | Rao | 711/154 |
| 2004/0039884 A1 * | 2/2004 | Li | 711/156 |

OTHER PUBLICATIONS

James Noble, Charles Weir: "Proceedings of the Memory Preservation Society—Patterns for managing limited memory" Internet Document, [Online] Sep. 13, 1998, URL:http//www.charlesweir.com/papers/Mempres8AsHtml.html.

"Six Tips for Efficient Memory Use" Mar. 17, 2004, URL:http://www.microsoft.com/whdc/driver/perform/mem-alloc.mspx>.

"APPC Memory and Segment Selector Reuse Buffer Pool" IBM Technical Disclosure Bulletin, IBM Corp. New Ork, US, vol. 35, No. 6, Nov. 1, 1992, p. 6.

Shrivastava S K et al: "The Design of a Reliable Remote Procedure Call Mechanism" IEEE Transactions on Computers, IEEE Service Center, Los Alamitos, CA, US, vol. C-31, No. 7 Jul. 1982.

* cited by examiner

SYSTEM AND METHOD FOR HANDLING MEMORY ALLOCATION FAILURES THROUGH RESERVE ALLOCATION OF EVENT DATA

TECHNICAL FIELD

The present disclosure is generally related to error handling in computer software, and more specifically, to error handling of memory allocation failure in computer software that uses an event driven architecture.

BACKGROUND

Computer programs commonly use a combination of static and dynamic memory allocation. A static memory allocation occurs when a program loads, before it executes. If the static allocations by a particular program exceed the available memory, the operating system will not load the program. A dynamic memory allocation occurs after a program loads, while it is executing. When a dynamic allocation failure indicates that required resources are not available, the program may not be able to continue normal execution.

In such a case, the preferred behavior is to indicate to the user that a problem has occurred, gracefully terminate any outstanding actions, and then exit the program. Graceful termination might include closing any open files, restoring the display to an initial state, and terminating any network connections and/or connections with external devices. Graceful termination could also include notifying another program— either local or remote—that this program is exiting.

However, graceful termination after a dynamic allocation failure can be difficult to implement when the program uses an event-driven architecture with an operating system that provides multi-tasking. In this type of architecture, at least some communication between program components (for example, but not limited to, tasks, processes or threads) occurs via events or messages rather than function calls. Therefore, when a component attempts to dynamically allocate memory for an event and this event allocation fails, the component is unable to notify other components of the failure, thus preventing graceful termination.

DETAILED DESCRIPTION

One embodiment, among others, provides a system that includes requester logic and responder logic. The requester logic is configured to allocate memory for a request event data structure, and to send the request with the request event data structure and receive a response to the request. The responder logic is configured to receive the request from the requester and to, on receipt of the request, allocate memory for a reserve event data structure associated with the response. The responder logic is further configured to, on completion of the request, allocate memory for a response event data structure associated with the response. The responder logic is further configured to, on a successful allocation of response event data structure, deallocate memory for the reserve event data structure and notify, through the response with third event data, the requester of completion of the request. The responder logic further configured to, on an unsuccessful allocation of response event data structure, notify, through the response with reserve event data structure, the requester of completion of the request.

Figure 1:
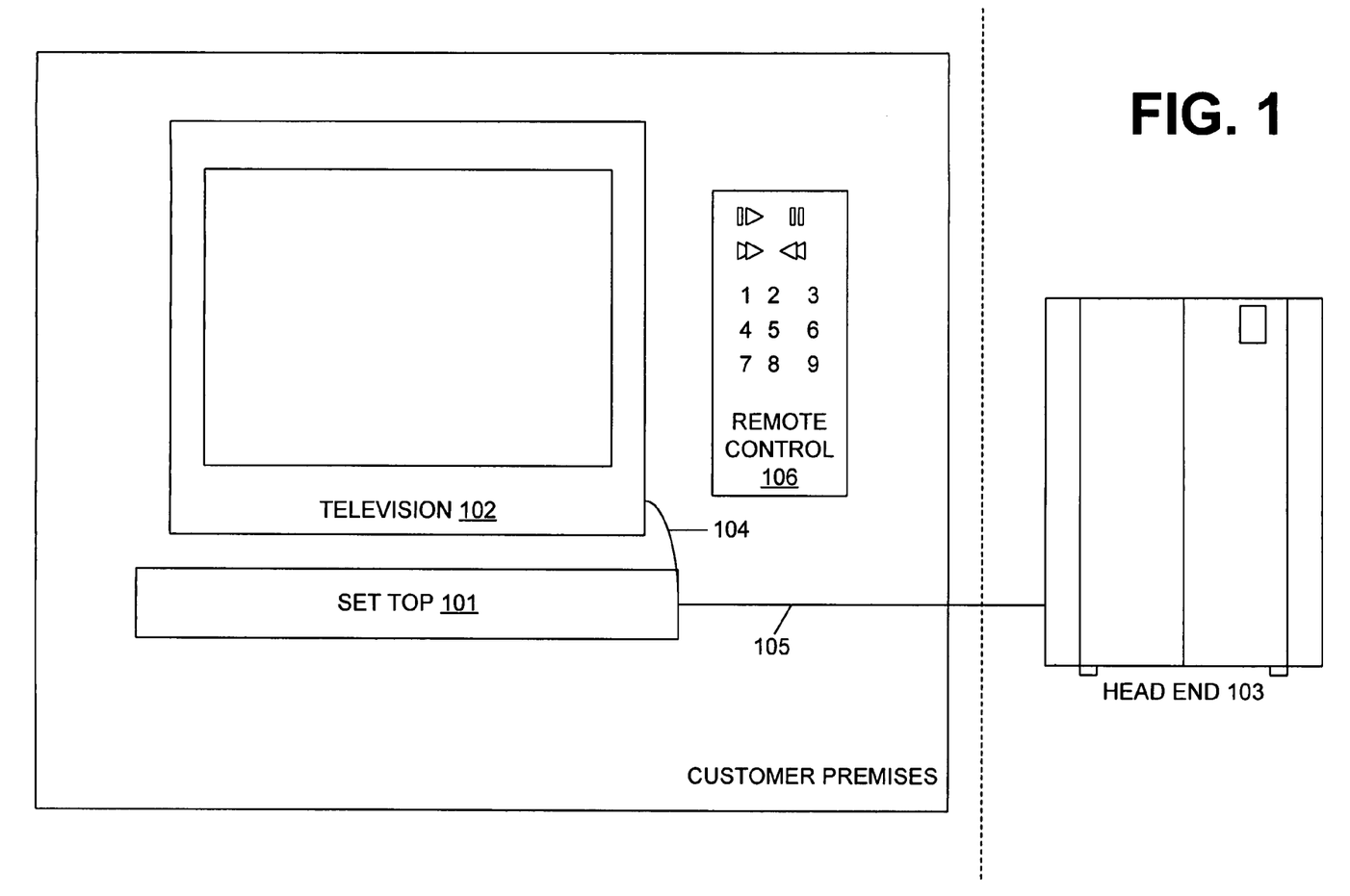
FIG. 1 is a block diagram of the environment for one embodiment of the system for reserve allocation of event data.

FIG. 1 is a block diagram of the environment for one embodiment of the system for reserve allocation of event data. This particular embodiment resides in a "set-top," a consumer electronics device which provides a user with cable television services. Set-top 101 and television 102 reside at the customer premises, and a "headend" 103 resides at facilities operated by the cable television provider. Set-top 101 connects to television 102 through cable 104 and to headend 103 through cable 105. In one embodiment, cable 104 is coaxial, and cable 105 is hybrid fiber-coax. A user controls set-top 101 through remote control 106, through controls on set-top 101 itself, or a combination of the two. Headend 103 transmits video-on-demand programming, among other signals, to set-top 101. Using the features of set-top 101, a user can select a video-on-demand program for viewing at any time, rather than at a time determined by the cable provider. While watching an on-demand program, the user can pause, fast-forward, rewind, etc.

Although the memory management techniques used by the system for reserve allocation of event data will be discussed in the context of a set-top for use with cable television services, the techniques disclosed herein are not limited to application in a set-top, or even to consumer electronic devices or embedded systems. The techniques disclosed herein are applicable to any computer software which uses an event-driven architecture in conjunction with dynamic allocation of event data.

Figure 2:
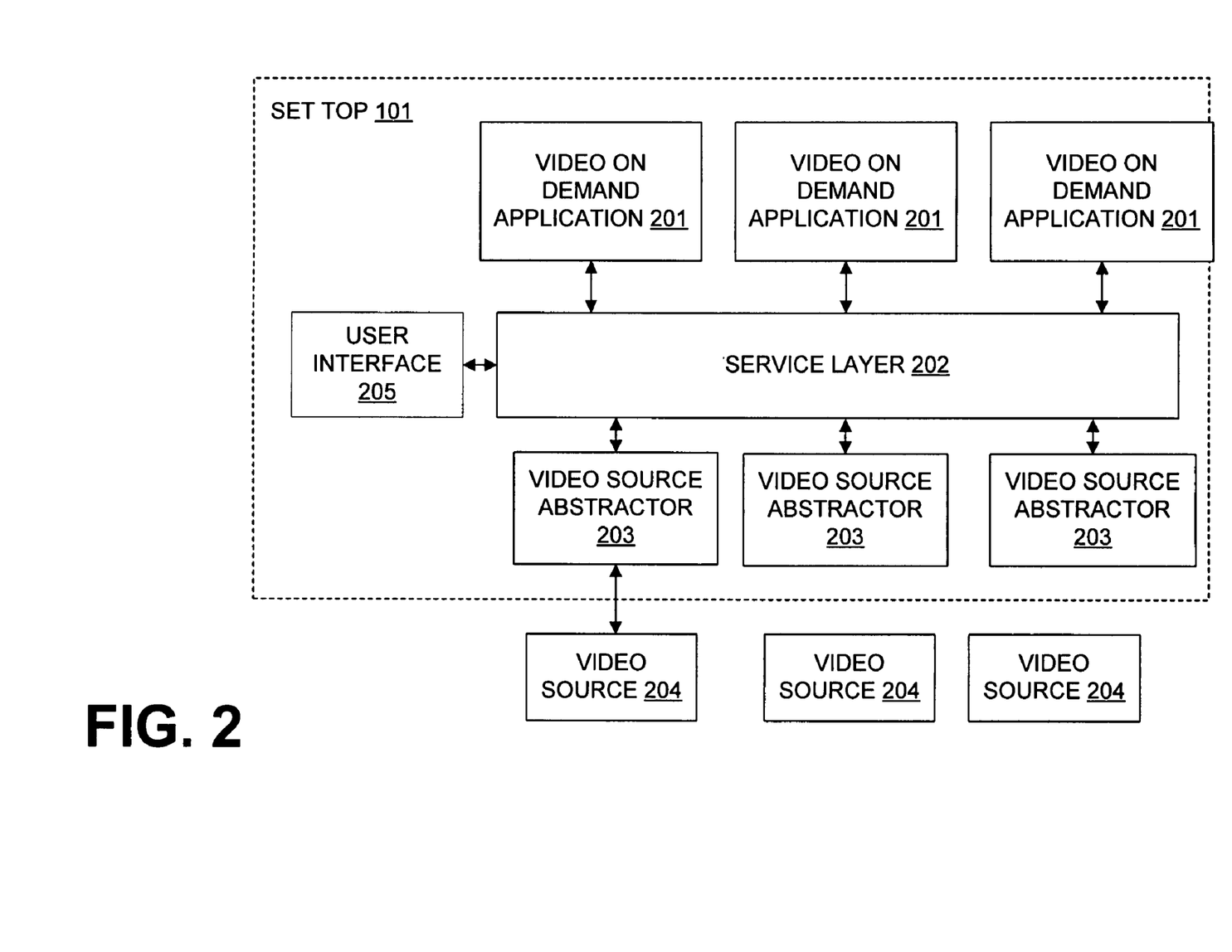
FIG. 2 is a software component diagram for one embodiment of the system for reserve allocation of event data.

FIG. 2 is a block diagram of the environment for one set-top embodiment of the system for reserve allocation of event data. One or more video on demand applications 201 communicate with service layer 202 to request a video-on-demand service. Service layer 202 processes each request and forwards it to one of the one or more video source abstractors 203. Each video source abstractor 203 is in communication with a corresponding video source 204 residing in headend 103. Video source abstractor 203 provides a common interface to the set-top 101 components, hiding the details of different types of video sources. In response to video-on-demand requests, video source 204 streams video content to video source abstractor 203, and video source abstractor 203 notifies service layer 202 of the completion of the request. Service layer 202 then forwards the completion notification to the corresponding application 201. Video source abstractor 203 also interacts with service layer 202 and with user interface 205 to display the received video stream in a window on television 102 (FIG. 1).

Figure 3:
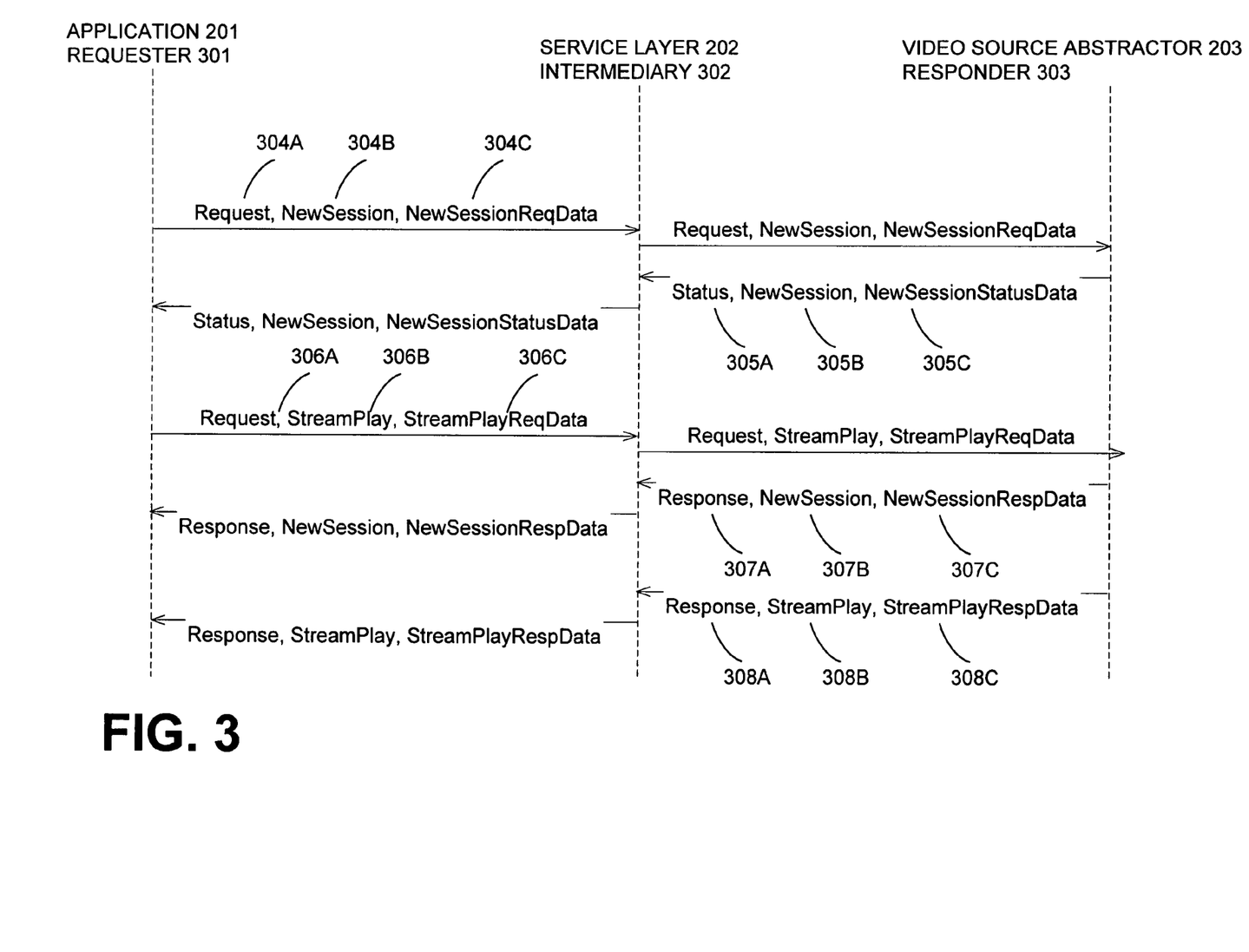
FIG. 3 is an event flow diagram for the software components of FIG. 2.

FIG. 3 is an example event flow diagram for the software components of the set-top of FIG. 2, focusing on the events (also referred to as "messages") which the components use to communicate with each other. Events are used rather than making programmatic function calls between components. Three of the software components of FIG. 2 (application 201, service layer 202, video source abstractor 203) are shown here exchanging events, but in this figure, the components have been given additional names to reflect their basic messaging roles as described above in connection with FIG. 2. Application 201 is the requester 301. Service layer 202 is the intermediary 302. Video source abstractor 203 is the responder 303. The particular events illustrated in this example are appropriate for a set-top embodiment. Other events and event sequences could be used by other embodiments, as appropriate. The disclosure herein is applicable to all event-driven systems that include requester and responder roles.

There are five events shown in FIG. 3: 304; 305; 306; 307; and 308. Each event has a corresponding type: 304A; 305A; 306A; 307A; and 308A. Each of these types corresponds to request, response, or status. Each event also has a code identifying the specific event: 304B; 305B; 306B; 307B; and 308B. Each event is also associated with data. This data is stored in a structure: 304B; 305B; 306B; 307B; and 308B. The contents and format of each structure are specific to the event code. For example, the event RequestNewSession 304 has event data 304C of type NewSessionReqData, while event StatusNewSession 305 has event data 305C of type NewSessionStatusData.

At any point in time, there can be multiple requests for which the responder 303 has not yet generated a response. FIG. 3 shows an example of this. After the StreamPlayRequest event 306 is delivered from requester 301 to intermediary 302, there are two outstanding requests: NewSessionRequest 304 and StreamPlayRequest 306. The event data memory management techniques disclosed herein generate responses for these outstanding requests even when an allocation of event data fails. These responses indicate "action cancelled" or "event failed" rather than successful completion.

In this example embodiment, the producer of an event is responsible for allocating memory for its associated event data, and the consumer of the event is responsible for freeing the memory. Responsibilities for allocation and deallocation could be assigned in another way. For example, in another embodiment the producer is responsible for allocation and deallocation. In FIG. 3, the requester 301 is the producer of request events, so is responsible for allocating memory for the event data associated with a request event. As the request event passes from requester 301 to intermediary 302, and from intermediary 302 to responder 303, ownership of the memory for the request event data passes also. Thus, memory for NewSessionReqData event data 304C is allocated by requester 301, but ownership of the memory passes to intermediary 302 when the event is sent to intermediary 302. When intermediary 302 forwards the event on to responder 303, responder 303 takes ownership of the memory for the NewSessionReqData event data 304C. Since responder 303 is the consumer of the request event, responder 303 is responsible for freeing the memory for the NewSessionReqData event data 304C.

Other embodiments may divide responsibilities for allocation and deallocation in another way. For example, in another embodiment the producer is responsible for both allocation and deallocation, and ownership does not pass from component to component along with the event.

Similarly, since responder 303 is the producer of a response or status event, responder 303 is responsible for allocating memory for the associated event data. Ownership of the memory for the response or status event data also passes between software components as the event itself passes among components.

Figure 4A:
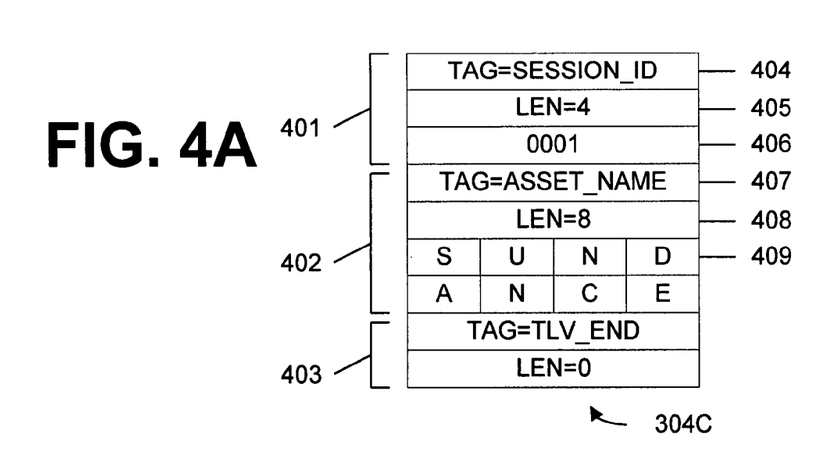
FIGS. 4A and 4B show two representations of one type of event data from FIG. 3.
Figure 4B:
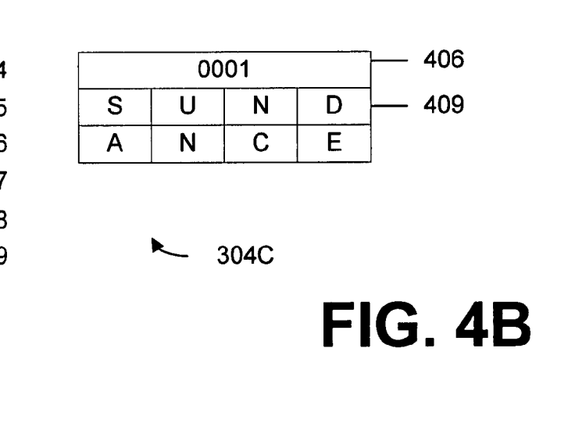

FIGS. 4A and 4B show two different representations of event data 304C (NewSessionReqData) from FIG. 3. Requester 301 uses this particular event to request the responder 303 to create a new session, for delivering one piece of video content from one particular video source. Creating a new session requires two pieces of information: a session id 401 and an asset name 402. The session id 401 will be used to refer to the newly-created session in all future requests, statuses, and responses. The asset name 402 identifies the video content associated with this new session.

The embodiment of FIG. 4A uses a flexible tag-length-value (TLV) format to describe event data 304C (FIG. 1). The TLV format permits arbitrary-length lists of data items. Each item of the event data is described by a tag, followed by a length, followed by a value. The last item in this TLV format has a tag of zero and a length of zero. NewSessionReqData 304C is made up of two items, session id 401 and asset name 402, followed by end tag 403. Session id 401 consists of a tag value 404 representing "session id," then the id length 405 (in this case, 4 bytes), then the id 406 (4 bytes). Asset name 402 consists of a tag value 407 representing "asset name," then the name length 408 (in this case, 8 bytes), then the name 409 (8 bytes). Although FIG. 4A shows a particular ordering to the items in the event data, the TLV format allows the items to be arranged in any order, since each item is identified by a unique tag.

In contrast, the items within the event data in the embodiment of FIG. 4B have fixed sizes, and occur at fixed offsets in the structure. Thus, in FIG. 4B the first item in NewSessionReqData 304C is the data 406 for the session id, and the second item is the data 409 for the asset name. Neither the length of an item nor its type is explicitly encoded, but is instead encoded by position. This results in a more compact format compared to the TLV format of FIG. 4A.

Figure 5A:
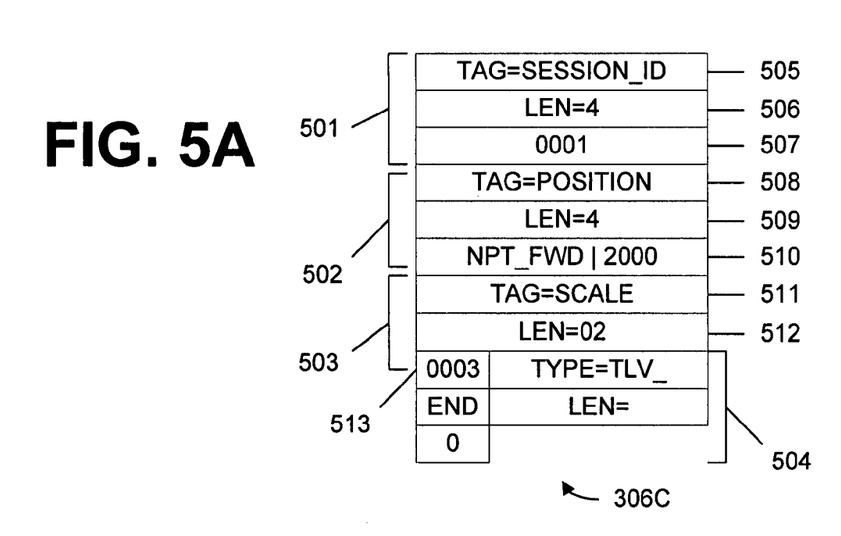
FIGS. 5A and 5B show two representations of another type of event data from FIG. 3.
Figure 5B:
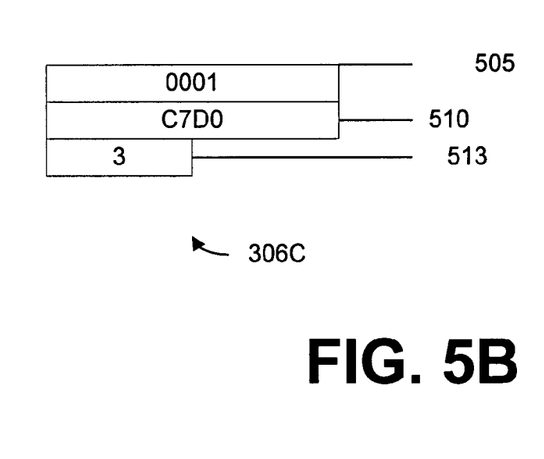

FIGS. 5A and 5B show the same representations of another type of event data, this one for the RequestStreamPlay event 306C. This particular event requests the video source to play the video stream associated with a particular session, and requires three pieces of information: the session id 501, the starting stream position 502, and the play speed 503.

In the TLV format of FIG. 5A, StreamPlayReqData 306C is made up of three items (session id 501, position 502, speed 503) followed by end tag 504. Session id 501 consists of a tag value 505 representing "session id," then the id length 506 (in this case, 4 bytes), then the id 507 (4 bytes). Position 502 consists of a tag value 508 representing "position," then the position length 509 (in this case, 4 bytes), then the position 510 (4 bytes). Speed 503 consists of a tag value 511 representing "speed," then the position length 512 (in this case, 2 bytes), then the speed 513 (2 bytes).

In the embodiment of FIG. 5B, items have fixed sizes and positions. The first item in StreamPlayReqData 306C is the data 507 for the session id, the second item is the data 510 for the position, and the third item is the data 513 for the speed.

At any point in time, there can be multiple requests for which the responder 303 has not yet generated a response. FIG. 3 shows an example of this. After the StreamPlayRequest event 306 is delivered from requester 301 to intermediary 302, there are two outstanding requests: NewSessionRequest 304 and StreamPlayRequest 306. The event data memory management techniques disclosed herein generate responses for these outstanding requests even when the pool of event data is exhausted. The responses indicate "action cancelled" or "event failed" rather than successful completion. Components handle these failure indications in a graceful manner, allowing the system to gracefully exit in response to this out-of-memory condition.

Figure 6:
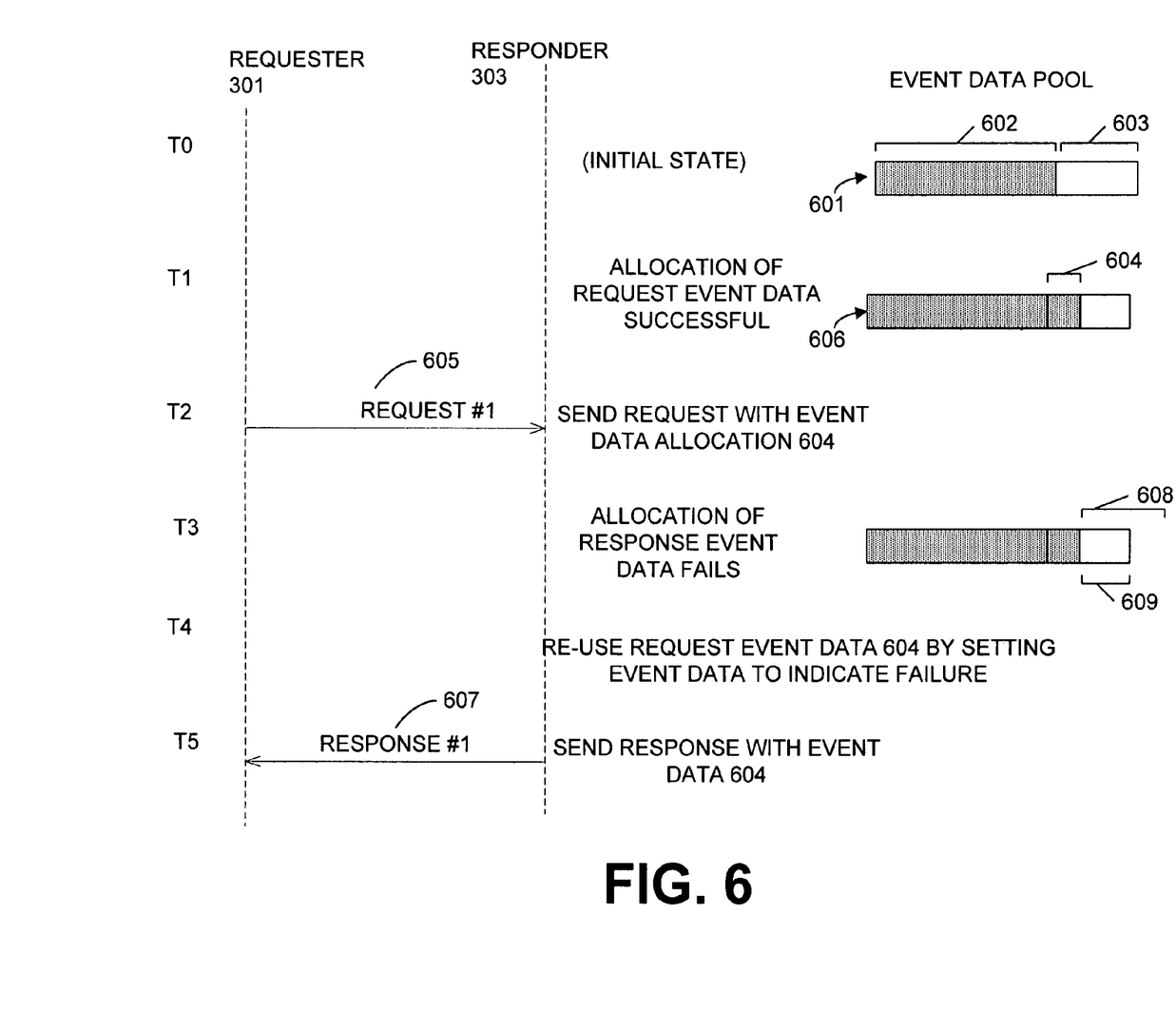
FIG. 6 is a diagram illustrating the memory management techniques used by one embodiment of the system for reserve allocation of event data.

FIG. 6 is a diagram illustrating these event data memory management techniques used by one embodiment of the system for reserve allocation of event data. In this embodiment, when an allocation of response event data from the event data pool is unsuccessful, memory for request event data is recycled as memory for response event data. The contents of the response event data are initialized to indicate that the request failed, and the failure code may indicate out-of-memory.

The left side of the diagram is an event diagram similar to the one shown in FIG. 3, but in simplified form. As events are passed among software components, event data is allocated and deallocated from the event data pool. For ease of illustration, request event data and response event data are shown as being allocated from the event data pool. However, in another embodiment request event data and response event data are allocated from different event data pools.

The right side of the diagram shows the state of the event data pool, correlated in time with the events shown on the left side. The event data pool is divided into an available portion and in-use portion.

For ease of illustration, requester 301 and responder 303 are shown as communicating with each other without intermediary 302. Another embodiment, using similar memory management techniques, includes intermediary 302 as described earlier with reference to FIG. 3.

The initial state of the event data pool at time t0 is shown by item 601. Some portion of the event data pool 601 is in-use (602), and the remaining portion (603) is available for allocation.

At time t1, memory 604 for event data associated with request event 605 is successfully allocated from the event data pool. In this embodiment, the system heap serves as the event data pool. The state of the event data pool after this allocation is shown by item 606: the in-use portion has increased and the available portion has decreased.

At time t2, request event 605 is sent from requester 301 to responder 303, along with memory 604 which stores event data associated with request event 605.

At time t3, responder 303 prepares to generate a response to request event 605. An attempt is made to allocate memory, from the event data pool, for the event data associated with the response 607. However, in this example scenario, the event data associated with response 607 is of a larger size (608) than the available portion 609 of the event data pool at this time.

Nonetheless, the memory management techniques disclosed herein allow response 607 to be delivered as follows. When this out-of-memory condition is encountered, responder 303 re-uses the event data memory 604 associated with the request 605 when sending the response 607, as shown at time t4. Event data memory 604 is initialized so that associated response 607 indicates a failure code (e.g., "action cancelled" or "event failed") rather than indicating the successful completion of request 605. In one embodiment, all allocations of event data for requests are guaranteed to be a minimum size, where this minimum size is large enough to indicate an appropriate failure code.

At time t5, responder 303 sends response 607 along with event data memory 604 (indicating failure) to requester 301. The response 607 thus completes the outstanding request 605. Once notified of this out-of-memory failure, various parts of the system may perform graceful exit handling. For example, in one embodiment, all other outstanding responses are completed with a failure/cancellation indication, using the memory management techniques described.

Figure 7:
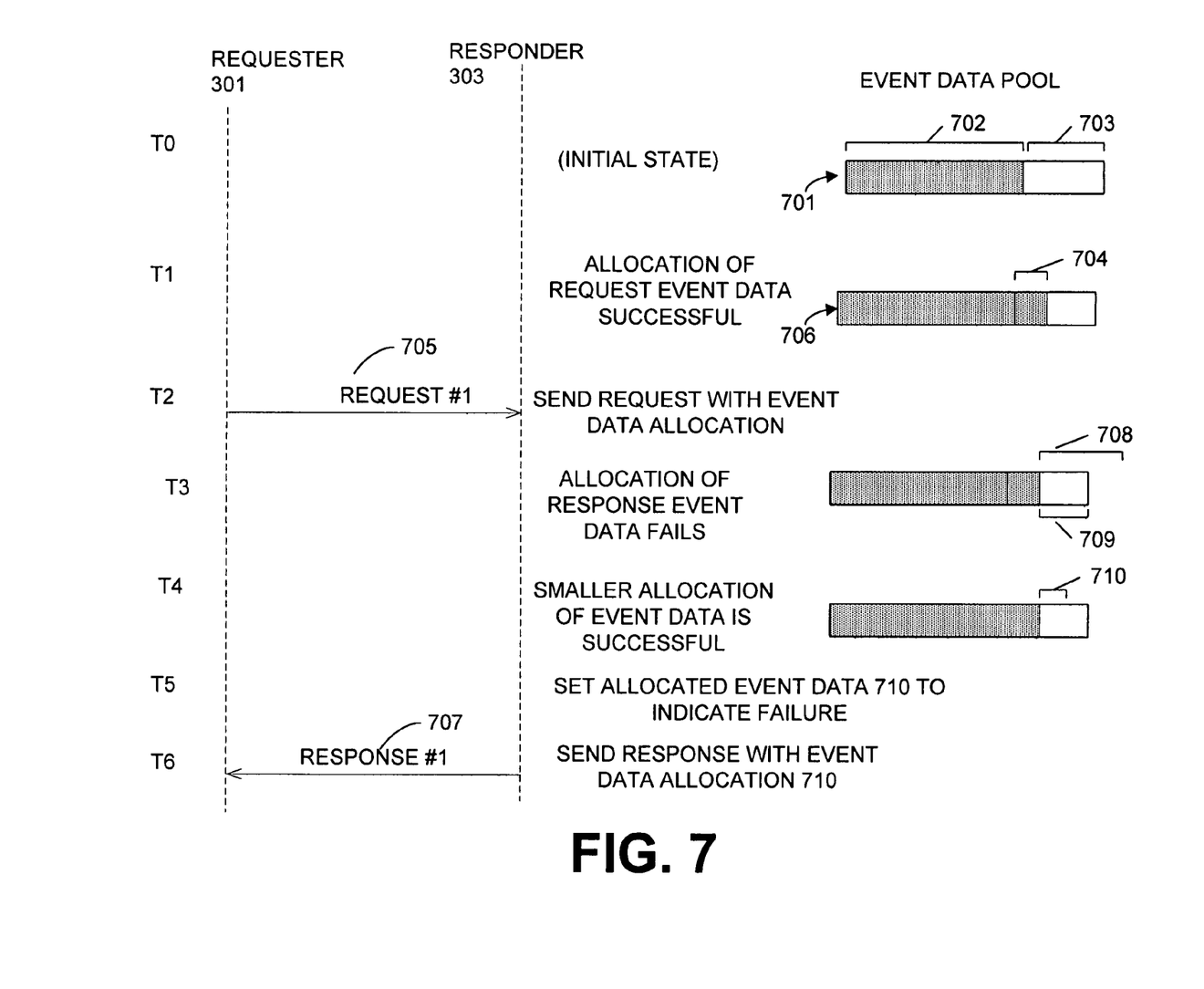
FIG. 7 is a diagram illustrating the memory management techniques used by another embodiment of the system for reserve allocation of event data.

FIG. 7 is a diagram illustrating these event data memory management techniques used by another embodiment of the system for reserve allocation of event data. In this embodiment, when an allocation of response event data from the event data pool is unsuccessful, a smaller amount of memory is allocated instead. The contents of this smaller response event data are initialized to indicate that the request failed, and the failure code may indicate out-of-memory. As with FIG. 6, the left side is an event diagram similar and the right side shows the state of the event data pool, correlated in time with the events shown on the left side.

The initial state of the event data pool at time to is shown by item 701. In this embodiment, the system heap serves as the event data pool. Some portion of the event data pool 701 is in-use (702), and the remaining portion (703) is available for allocation.

At time t1, memory 704 for event data associated with request event 705 is successfully allocated from the event data pool. The state of the event data pool after this allocation is shown by item 706: the in-use portion has increased and the available portion has decreased.

At time t2, request event 705 is sent from requester 301 to responder 303, along with memory 704 which stores event data associated with request event 705.

At time t3, responder 303 prepares to generate a response to request event 705. An attempt is made to allocate memory, from the event data pool, for the event data associated with the response 707. However, in this example scenario, the event data associated with response 707 is of a larger size (708) than the available portion 709 of the event data pool at this time. Therefore, the attempted allocation fails.

Nonetheless, the memory management techniques disclosed herein allow response 707 to be delivered as follows. When this out-of-memory condition is encountered, responder 303 allocates a smaller amount of memory 710 from the event data pool. This allocation is shown at time t4. Although not large enough to contain the data associated with a successful response, this smaller block of memory 710 is large enough to indicate an appropriate failure code.

At time t5, event data memory 710 is initialized so that associated response 707 indicates a failure code (e.g., "action cancelled" or "event failed") rather than indicating the successful completion of response 707.

At time t6, responder 303 sends response 707 along with event data memory 710 (indicating failure) to requester 301. The response 707 thus completes the outstanding request 705. Once notified of this out-of-memory failure, various parts of the system may perform graceful exit handling. For example, in one embodiment, all other outstanding responses are completed with a failure/cancellation indication, using the memory management techniques described.

Figure 8:
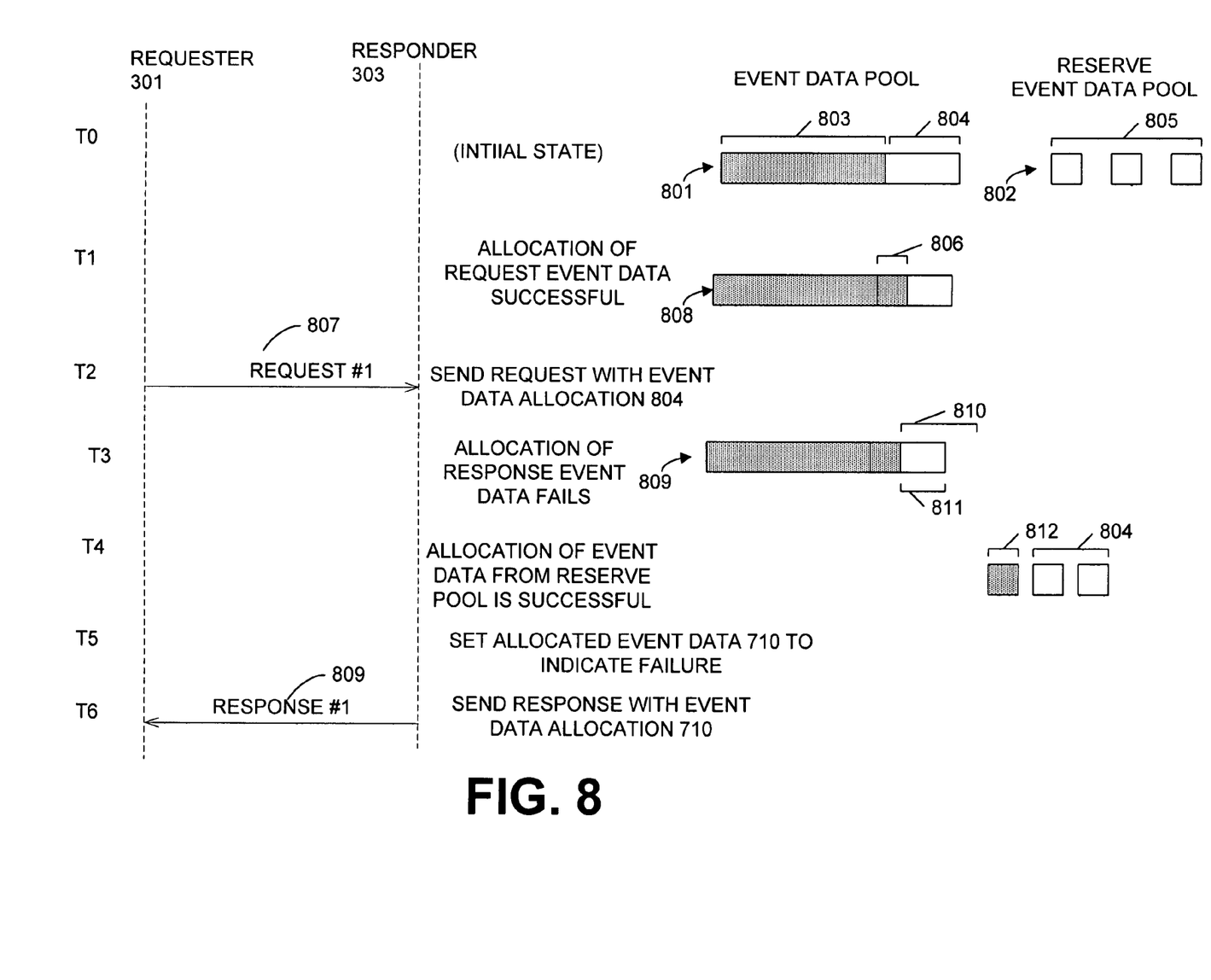
FIG. 8 is a diagram illustrating the memory management techniques used by yet another embodiment of the system for reserve allocation of event data.

FIG. 8 is a diagram illustrating these event data memory management techniques used by yet another embodiment of the system for reserve allocation of event data. In this embodiment, when an allocation of response event data from the event data pool is unsuccessful, response event data is then allocated from a separate reserve event data pool. The contents of the reserve event data are initialized to indicate that the request failed, and the failure code may indicate out-of-memory.

As with FIGS. 6 and 7, the left side is an event diagram similar and the right side shows the state of the event data pool, correlated in time with the events shown on the left side. The far right side of this diagram shows the state of the reserve event data pool.

The initial state of the event data pool and the reserve event data pool at time to is shown by items 801 and 802, respectively. The memory for the reserve event pool comes from a different source than regular event data. In one embodiment, the reserve event data pool is statically allocated during initialization, while the system heap serves as the pool for regular event data. In another embodiment, the reserve event data pool is allocated at run-time during processing of a particular request event, for example, when a session is created.

Some portion of the event data pool 801 is in-use (803), and the remaining portion (804) is available for allocation. In this example, the entire reserve event data pool 802 is available (805).

At time t1, memory 806 for event data associated with request event 807 is successfully allocated from the event data pool. The state of the event data pool after this allocation is shown by item 808: the in-use portion has increased and the available portion has decreased.

At time t2, request event 807 is sent from requester 301 to responder 303, along with memory 806 which stores event data associated with request event 807.

At time t3, responder 303 prepares to generate a response to request event 807. An attempt is made to allocate memory, from the event data pool, for the event data associated with the response 809. However, in this example scenario, the event data associated with response 809 is of a larger size (810) than the available portion 811 of the event data pool at this time. Therefore, the attempted allocation fails.

Nonetheless, the memory management techniques disclosed herein allow response 809 to be delivered as follows. When this out-of-memory condition is encountered, responder 303 allocates memory 812 to be used with response 809 from the reserve event data pool. This allocation is shown at time t4. This block of memory 812 is large enough to indicate an appropriate failure code.

At time t5, event data memory 812 is initialized so that associated response 809 indicates a failure code (e.g., "action cancelled" or "event failed") rather than indicating the successful completion of request response 809.

At time t6, responder 303 sends response 809 along with event data memory 812 (indicating failure) to requester 301. The response 809 thus completes the outstanding request 807. Once notified of this out-of-memory failure, various parts of the system may perform graceful exit handling. For example, in one embodiment, all other outstanding responses are completed with a failure/cancellation indication, using the memory management techniques described.

FIGS. 3-8 are not intended to be a complete description of the event flows of the system, and have been simplified in several ways to focus on particular aspects of the system. For example, FIGS. 3 and 6-8 show only one requester 301 and one responder 303, where the system may have multiple requesters 301 and/or multiple responders 303 (as shown in FIG. 2). In such a system with multiple event sources and destinations, intermediary 302 acts to route events to the proper destination. In the simplified system of FIGS. 3-8, all requests originate from requester 301. However, in another embodiment, responder 303 can also makes requests, to which requester 301 responds.

In handling a failure to allocate response event data from the event data pool, the embodiments shown in FIGS. 6-8 each obtains memory to indicate the failure through an associated response, and each obtains the memory from a different source. In FIG. 6, the memory is obtained by re-using a request. In FIG. 7, the memory is obtained by using a smaller response event data block allocated from the event data pool. In FIG. 8, the memory is obtained from a separate reserve event data pool. These techniques can also be combined in various ways.

Figure 9:
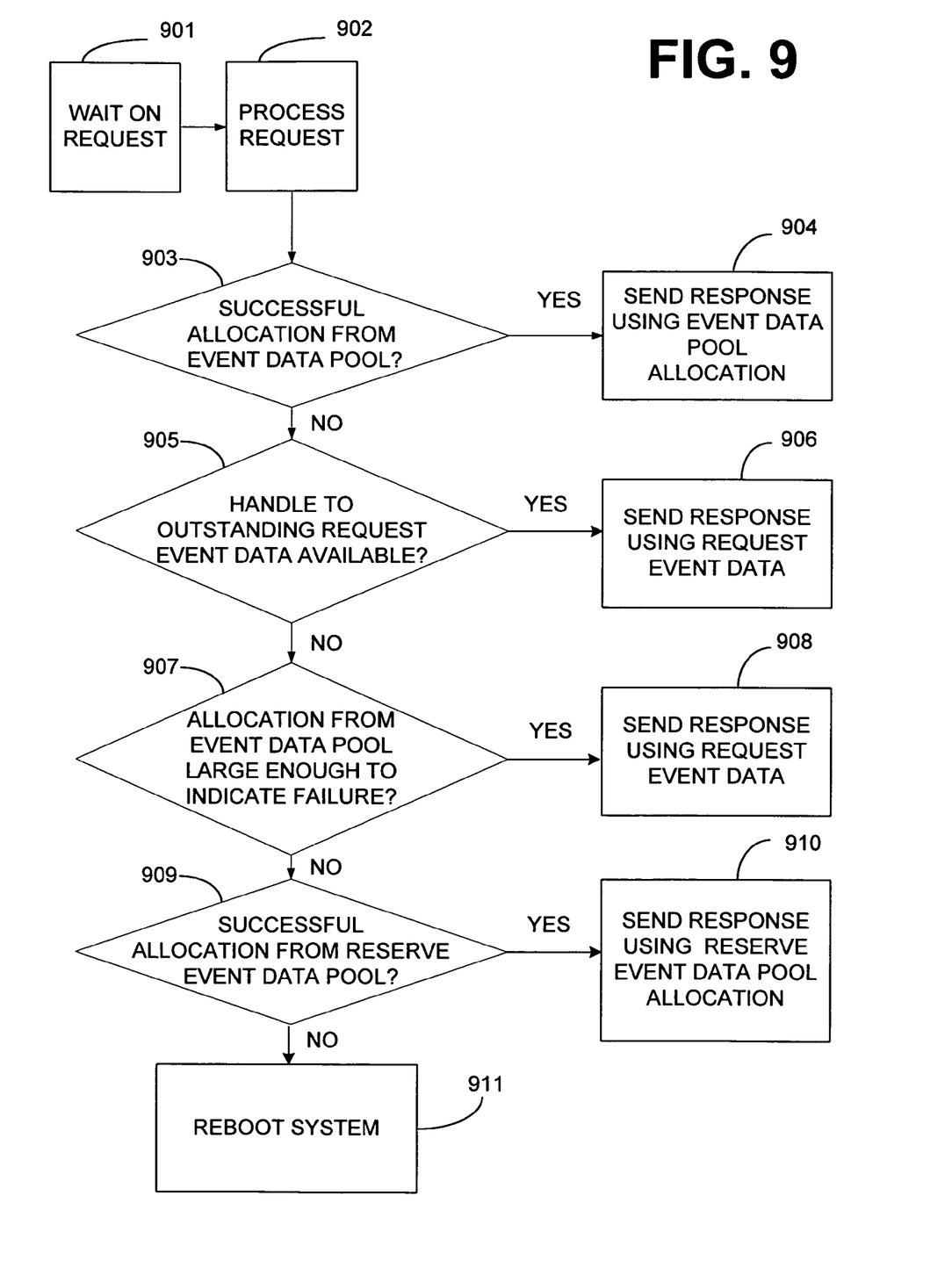
FIG. 9 is a flow chart of one embodiment of the system for reserve allocation of event data, illustrating the actions executed by the responder 303 from FIG. 3.
Figure 10:
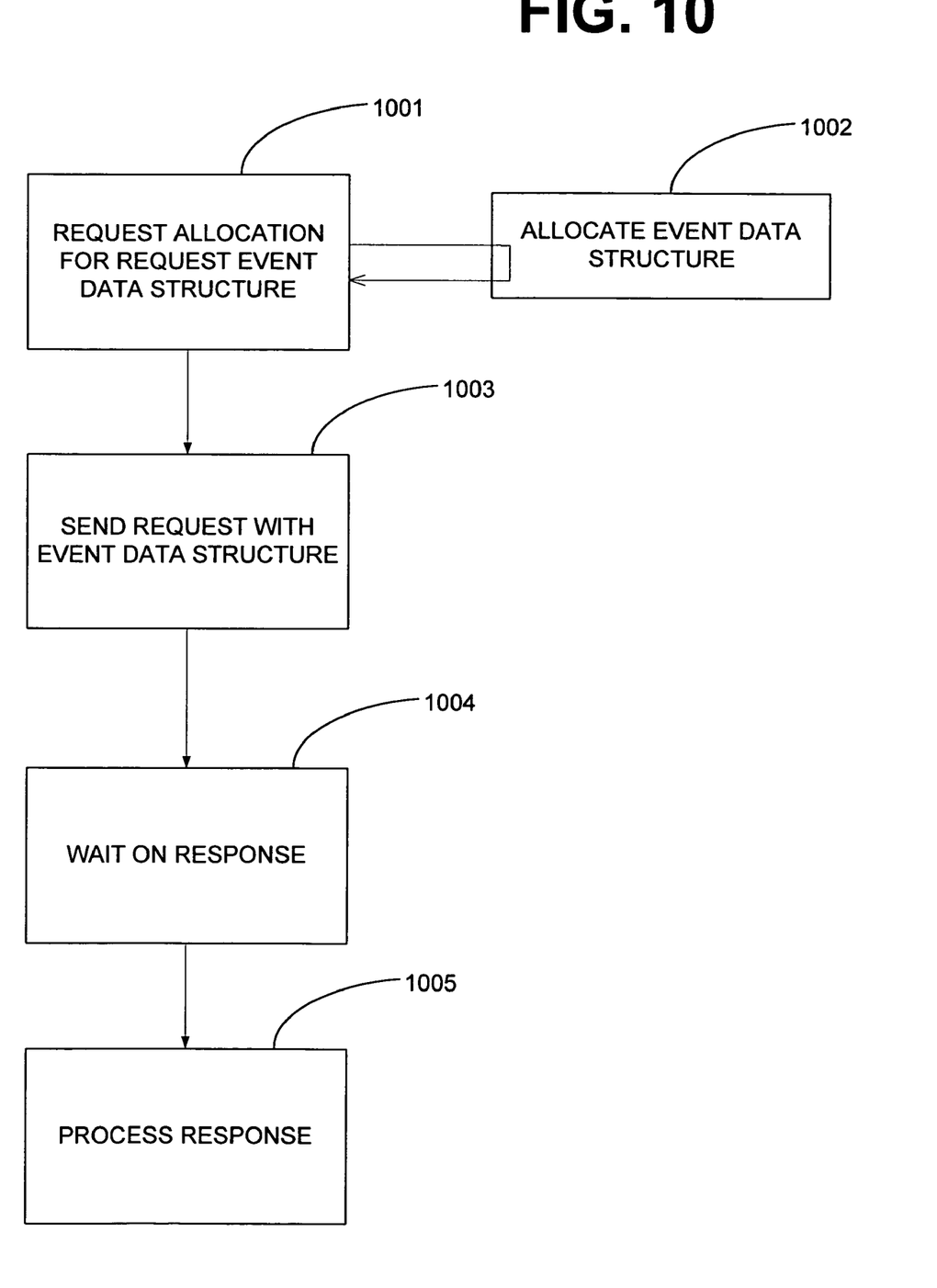
FIG. 10 is a flow chart of one embodiment of the system for reserve allocation of event data, illustrating the actions executed by the requester 301 from FIG. 3.

FIGS. 9 and 10 are flowcharts showing one embodiment of the system for reserve allocation of event data which combines all three techniques. This embodiment first attempts to re-use request event data if a handle to it is still available. If not, a smaller block from the event data pool is used. Finally, if this smaller block is not available, then the reserve event data pool is used.

FIG. 9 is a flowchart of this embodiment, illustrating the actions executed by responder 303. The process begins at step 901, where responder 303 waits for a request from requester 301. When a request is received, processing continues at step 902, where the request is processed. Next, memory for a response to the request is obtained. Step 903 first attempts to allocate memory for response event data from the event data pool. If this allocation is successful, processing continues at step 904, where a response is sent using the response event data allocated from the event data pool.

If the allocation from the event data pool was not successful, processing continues at step 905. At step 905, responder 303 determines if a handle to event data associated with an outstanding request is available. If Yes, processing continues at step 906, where a response is sent using the event data of the outstanding request.

If a handle was not available, processing continues at step 907. At step 907, responder 303 determines if the event data pool has enough available memory to allocate response event data which indicates failure. If Yes, the failure indication event data is allocated, and processing continues at step 908. At step 908, a response is sent using the failure event data allocated from the event data pool.

If not enough memory was available in the event data pool to indicate a failure, processing continues at step 909. At step 909, responder 303 allocates event data indicating failure from the reserve event data pool. At step 910, a response is sent using this reserve allocation.

FIG. 10 is a flow chart of the embodiment of FIG. 9 but illustrating the actions executed by the requester 301. The process begins at step 1001, where the requester 301 requests an allocation for event data associated with a request. The allocation is carried out in step 1002. In step 1003, the request is sent to responder 303 along with the allocated event data. Step 1004 waits on a response to the request. The process completes at step 1005, where the response is processed.

Figure 11:
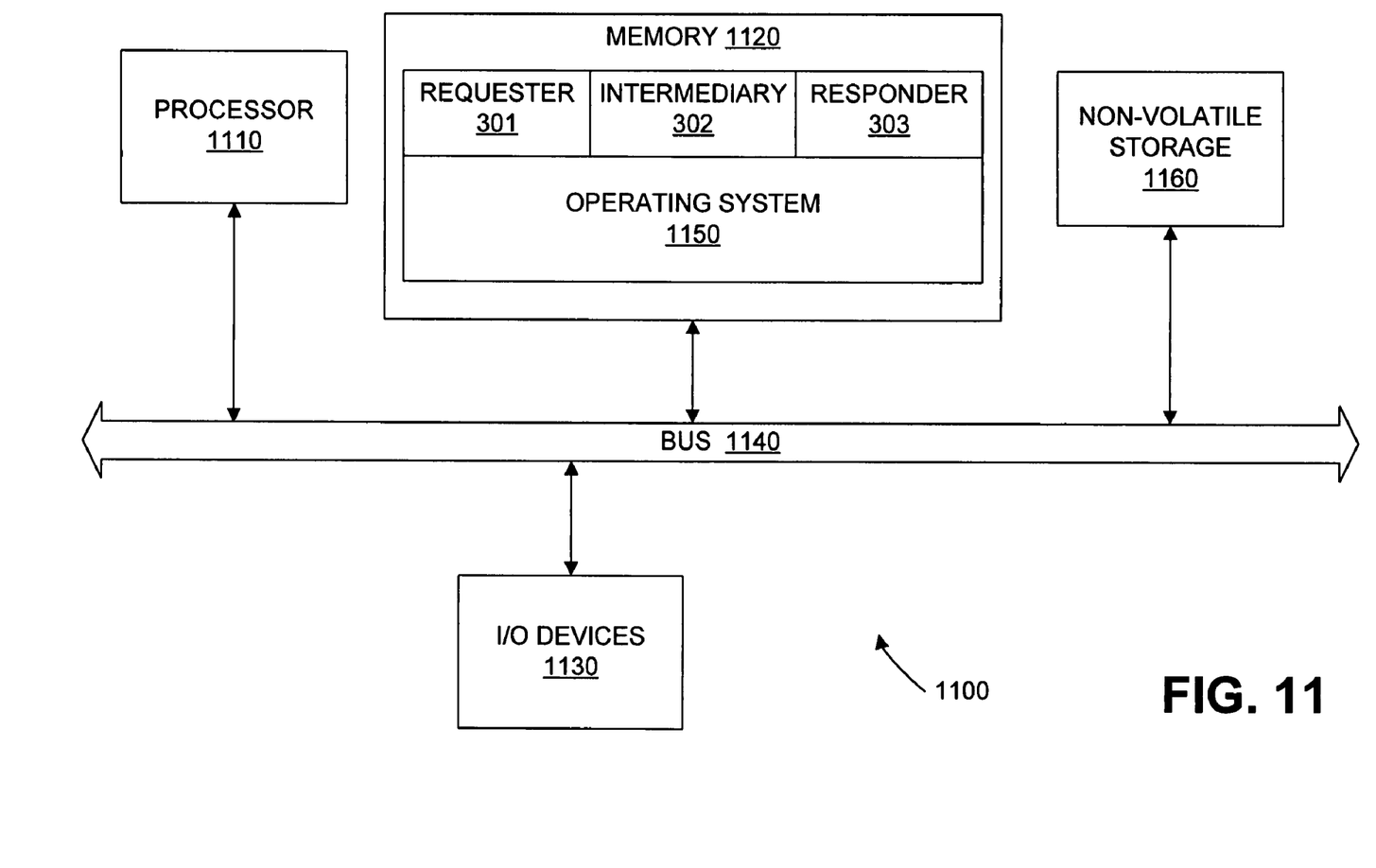
FIG. 11 is a block diagram of the set-top 101 from FIG. 1.

FIG. 11 is a block diagram of an embodiment of a computer system 1100 in accordance with the present disclosure. As known to those skilled in the art, a computer system typically includes a processor 1110, memory 1120 and input/output (I/O) device(s) 1130, all communicating over one or more buses 1140. The memory typically includes the operating system 1150, and in the present embodiment, also includes a requester 301, an intermediary 302, and a responder 303 (FIG. 3). The computer system also includes non-volatile storage 1160. The operating system is typically stored in non-volatile storage 1150 while the computer system 1100 is turned off, and loaded into volatile memory 1110 upon startup, where it can be executed by the processor 1100.

The foregoing description has been presented for purposes of illustration and description. It is not intended to be exhaustive or to limit the disclosure to the precise forms disclosed. Obvious modifications or variations are possible in light of the above teachings. The embodiments discussed, however, were chosen and described to illustrate the principles of the disclosure and its practical application to thereby enable one of ordinary skill in the art to utilize the invention in various embodiments and with various modifications as are suited to the particular use contemplated. All such modifications and variation are within the scope of the disclosure as determined by the appended claims when interpreted in accordance with the breadth to which they are fairly and legally entitled.

Therefore, having thus described the invention, at least the following is claimed:

1. A method comprising the steps of:
   receiving a request event from a first component, wherein the request event is received via a mechanism other than a function call from the first component, the request event associated with a request event parameter buffer, wherein the request event comprises at least one event associated with a video-on-demand service, the at least one event comprising at least one of new session request data and stream play request data associated with providing the video-on-demand service;
   receiving a response event from a second component, wherein the response event is received via a mechanism other than a function call from the second component, the response event associated with the received request event;
   allocating a response event parameter buffer from a first pool, wherein the response event parameter buffer is associated with the response;
   obtaining, upon failure of the allocation of the response event parameter buffer an out-of-memory indication buffer used to indicate that no memory was allocated for the response event;
   associating the out-of-memory indication buffer with the response event; and
   completing, upon obtaining the out-of-memory indication buffer and associating the out-of-memory indication buffer with the response event, the request event using the response event and the associated out-of memory buffer to indicate no memory was allocated for the response event, wherein completing the request event comprises sending the response event and the associated out-of-memory buffer to the first component to complete the request event, wherein the request event parameter buffer associated with the response is re-used when sending the response event to the first component.

2. The method of claim 1, wherein the obtaining further comprises:
   allocating the out-of-memory indication buffer from the first pool, wherein the size of the out-of-memory indication buffer is smaller than the size of the response event parameter buffer.

3. The method of claim 1, further comprising:
   allocating memory for a second reserve pool, wherein the second reserve pool is distinct from the first pool.

4. The method of claim 3, wherein the step of allocating memory for a second reserve pool is performed at system initialization.

5. The method of claim 3, wherein the step of allocating memory for a second reserve pool is performed in response to a specific request event.

6. The method of claim 3, wherein the obtaining step further comprises:
   allocating the out-of-memory indication buffer from the second reserve pool.

7. The method of claim 6, wherein the size of the allocation from the second reserve pool is fixed at a minimum necessary to indicate allocation failure.

8. The method of claim 1, further comprising:
   initializing the out-of-memory indication buffer to indicate that the request event failed.

9. The method of claim 1, further comprising:
   initializing the out-of-memory indication buffer to indicate that the memory allocation for the request event parameter buffer failed.

10. A computer readable medium storing a computer program, the computer program comprising:
    requester logic comprising:
        logic configured to allocate memory for request event data associated with a request event, wherein the request event comprises at least one event associated with a video-on-demand service, wherein the request event data comprises new session request data associated with providing the video-on-demand service, wherein the new session request data comprises a session id data and asset name data, and wherein a type associated with the session id data and the asset name data is encoded by a position within the new session request data;
        logic configured to send the request event with the memory storing request event data related to the request event to a first component via a mechanism other than a function call to the first component; and
    responder logic comprising:
        logic configured to receive the request event, with the memory storing request event data related to the request event, sent from the first component via a mechanism other than a function call from the first component;
        logic configured to allocate memory for response event data from a first pool, wherein the response event data is associated with a response, where the response event is associated with the request event;
        logic configured to obtain, upon failure of the allocation of memory for the response event data, memory for out-of-memory response event data used to indicate that no memory was allocated for the response event;
        logic configured to associate the out-of-memory response event data with the response and to send, upon obtaining the memory for the out-of-memory response event data and associating the out-of-memory response event data with the response, the response event and the out-of-memory response event data completing the request to indicate no memory was allocated for the response event, wherein the memory storing the request event data is re-used when sending the response event completing the request.

11. The computer readable medium of claim 10, further comprising:
    logic configured to allocate memory for a second reserve pool, wherein the second reserve pool is distinct from the first pool.

12. The computer readable medium of claim 11, wherein the logic configured to allocate memory for the second reserve pool executes at system initialization.

13. The computer readable medium of claim 11, wherein the logic configured to allocate memory for the second reserve pool executes in response to a specific request event.

14. The computer readable medium of claim 11, wherein the logic configured to obtain further comprises:
   logic configured to allocate the memory for out-of-memory response event data from the second reserve pool.

15. The computer readable medium of claim 11, further comprising:
   logic configured to initialize the memory for out-of-memory response event data to indicate that the request event failed.

16. The computer readable medium of claim 11, further comprising:
   logic configured to initialize the memory for out-of memory response event data to indicate that the memory allocation for the request event parameter buffer failed.

17. A device comprising:
   a processor configured to execute instructions from a memory, the instructions comprising:
      logic configured to receive an asynchronous response to a request, the response associated with response event data, the request associated with a request event parameter buffer wherein the request comprises a request event comprising at least one event associated with a video-on-demand service, the at least one event comprising at least one of new session request data and stream play request data associated with providing the video-on-demand service;
      logic configured to allocate a parameter buffer for the response event data from a first pool;
      logic configured to obtain, responsive to a failure of the allocation, an out-of memory indication buffer;
      logic configured to associate the out-of-memory indication buffer with the response event data; and
      logic configured to complete, upon obtaining the out-of-memory indication buffer and associating the out-of-memory indication buffer with the response event data, the request using the out-of-memory indication buffer, wherein completing the request comprises sending the response event data and the associated out-of-memory indication buffer to complete the request, wherein the request event parameter buffer associated with the request is re-used when sending the response event data.

18. The device of claim 17, the instructions further comprising:
   logic configured to allocate the out-of-memory indication buffer from the first pool, whenever the size of the out-of-memory indication buffer is smaller than the size of the parameter buffer.

* * * * *